Jan. 19, 1954  A. P. DAVIS  2,666,604
RETRACTABLE WIND SCOOP
Filed Jan. 14, 1952  4 Sheets-Sheet 1
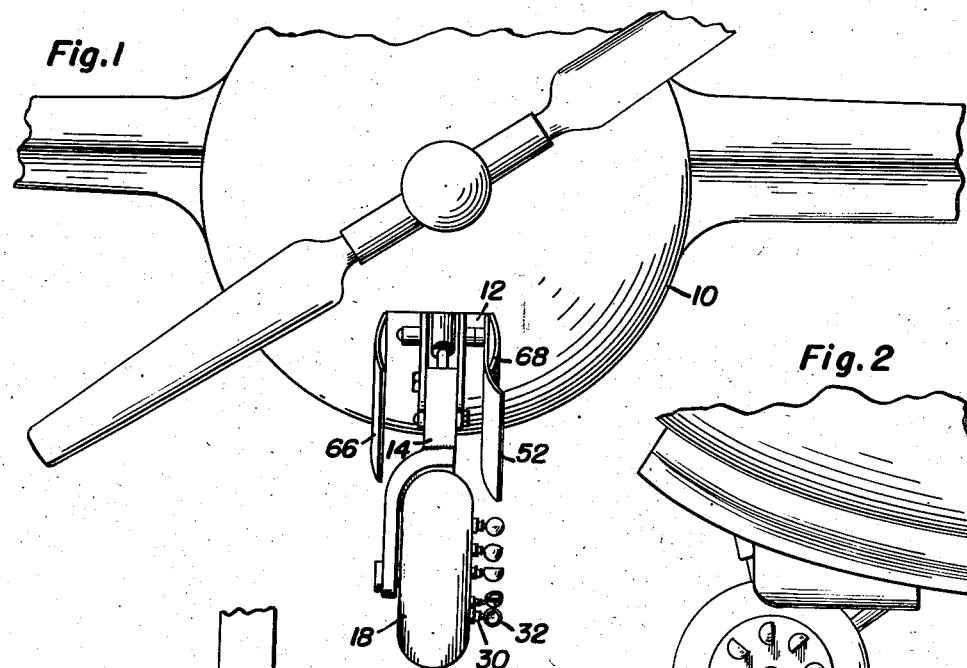
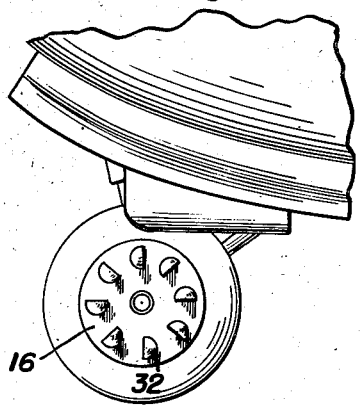
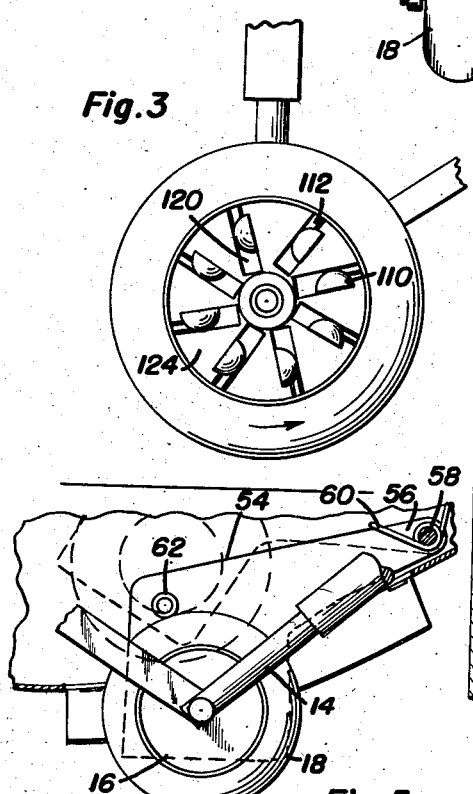
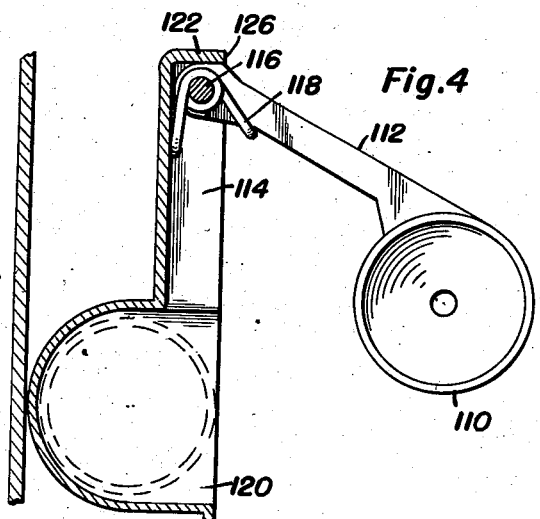
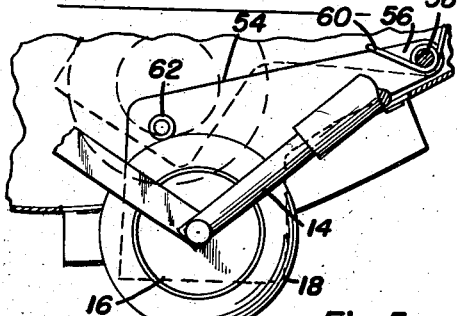
Albert P. Davis
INVENTOR.

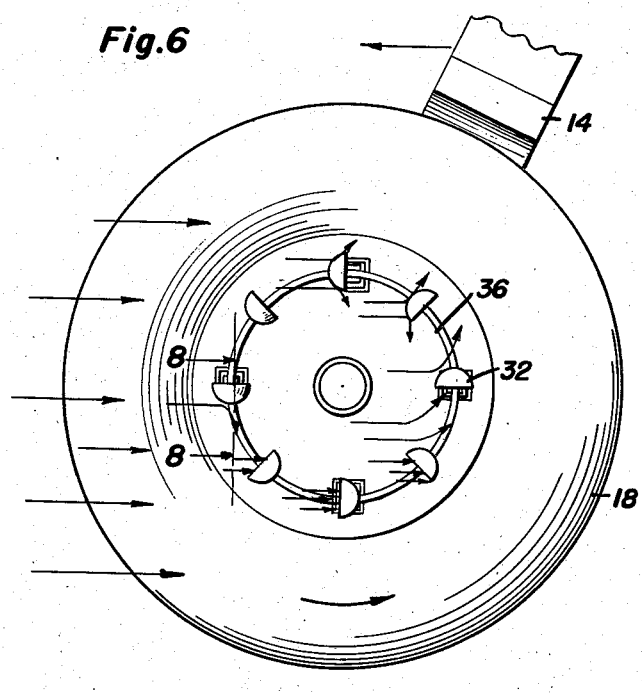
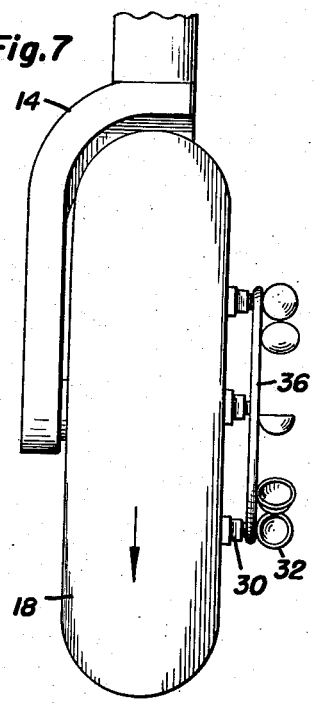
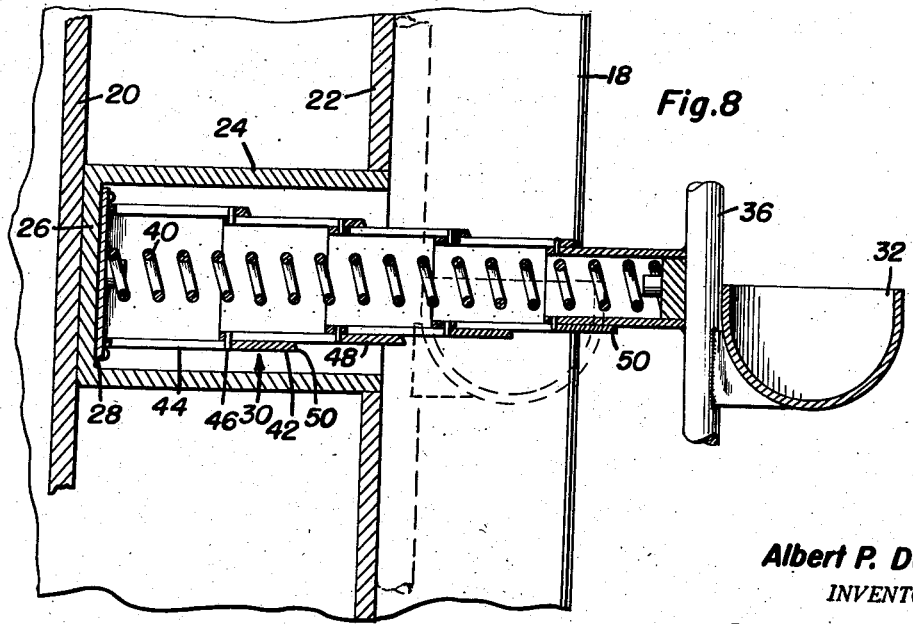

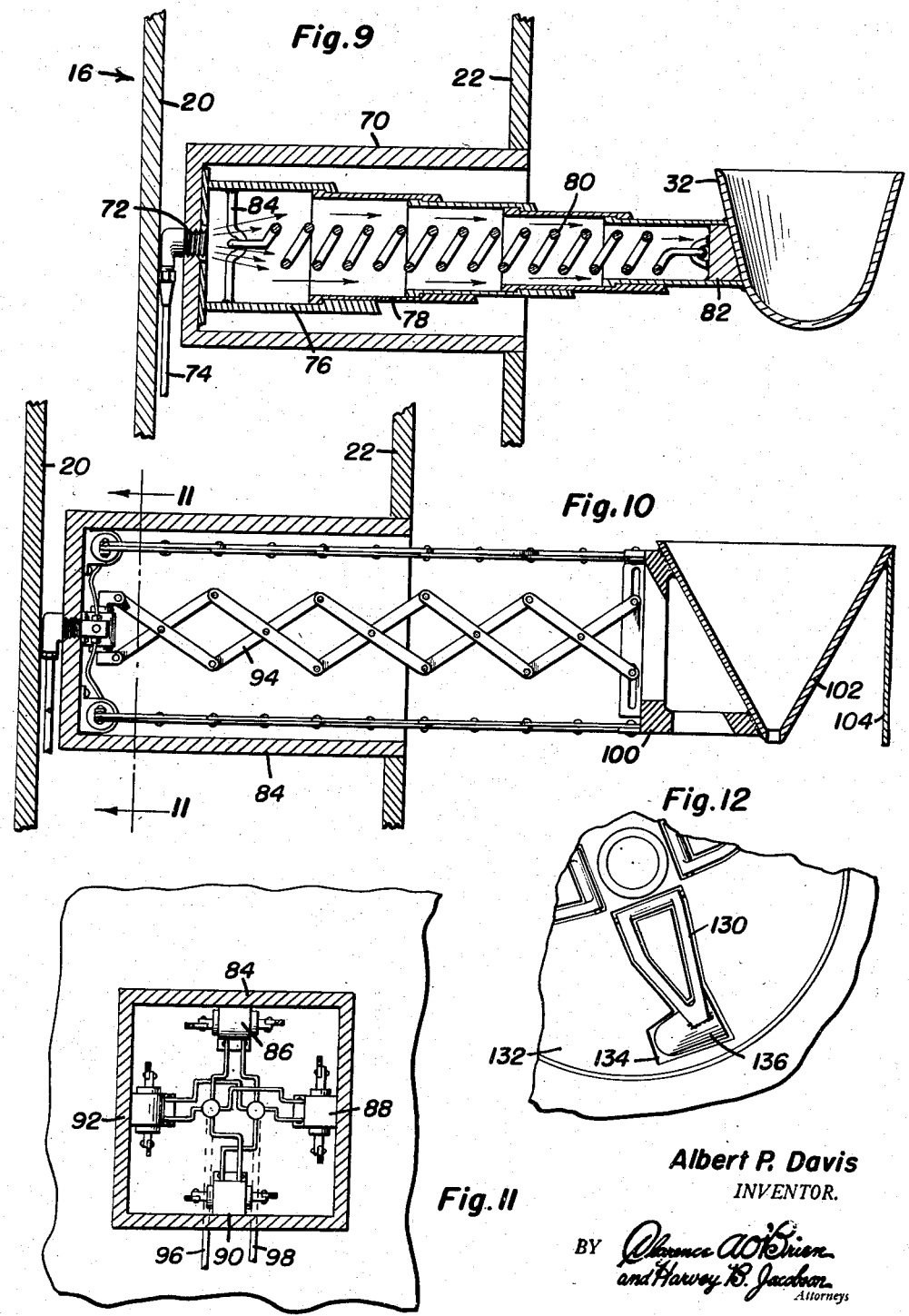

Jan. 19, 1954 A. P. DAVIS 2,666,604
RETRACTABLE WIND SCOOP
Filed Jan. 14, 1952 4 Sheets-Sheet 4

Albert P. Davis
INVENTOR.

Patented Jan. 19, 1954

2,666,604

UNITED STATES PATENT OFFICE 2,666,604

RETRACTABLE WIND SCOOP

Albert P. Davis, Haddon Heights, N. J.

Application January 14, 1952, Serial No. 266,273

11 Claims. (Cl. 244—103)

This invention relates to retractible wind scoops and particularly for anemometer type wind scoops mounted on the side of airplane wheels and projectable into the air stream alongside the wheel.

In the operation of modern aircraft wheels of various types are utilized for contacting the ground and for allowing the vehicle to roll over the surface of the ground. The landing wheels are normally at standstill during the landing operation until they touch the ground. As is well known modern aircrafts land at terrific ground speeds so that the initial inertia of the tire when it comes in contact with the ground causes severe abrasion of the tire before the wheel starts to turn. Also, the inertia of the wheel causes a considerable shock to the aircraft because of the sliding action of the tire until the instant when the wheel starts to turn.

It has heretofore been proposed to apply anemometer type wind scoops to the periphery of the airplane or other aircraft wheel. Any modern aircraft uses landing tire of such diameter that they extend laterally of the rim of the landing wheel to such an extent that a cup placed on the rim of the wheel is completely sheltered by the tire which so disturbs the air stream adjacent to the cups that not sufficient propeller action is applied by the air stream striking the cups. If the cups are mounted sufficiently out from the wheel to be beyond the disturbance of the air caused by the tire then they extend into the region where they interfere with the retractible operation of the wheels.

The present invention provides means for projecting the wind scoops beyond the action of the tire and at the same time makes them retractible so that they are housed in the wheel proper during the retractible period whereby the wheel may be folded or otherwise disposed of during flight without disturbing the wind scoops.

It is an object of this invention to provide an improved wind scoop mounting.

It is a further object of this invention to provide wind scoops which may be retracted or distended.

Another object of the invention is to provide a wind scoop mounting so that the wind scoops may be projected or retracted at the will of the operator.

Still another object of the invention is to provide wind scoops which in nowise interfere with the retractible action of the wheels.

Other objects and many of the attendant advantages of this invention will be apparent from the following detailed description taken in conjunction with the accompanying drawing, in which:

Figure 1 is an elevation of a portion of an aircraft showing a ground wheel partially retracted and showing the wind scoops extended beyond the tire;

Figure 2 is a side view of the wheel of Figure 1 showing the wheel in partially retracted position;

Figure 3 is a side view of an aircraft ground wheel showing a construction according to the invention;

Figure 4 is an enlarged detail showing of the mounting of the wind scoops as shown in Figure 3;

Figure 5 is an enlarged detail section showing the operation of the wind scoop retractor;

Figure 6 is a side view of a further construction according to the invention;

Figure 7 is a front elevation of the arrangement according to Figure 6;

Figure 8 is an enlarged sectional view of the invention extensible support arms;

Figure 9 is a view similar to Figure 8 and showing a modified support arm;

Figure 10 is an enlarged sectional view taken substantially on the plane indicated by the section line 10—10 of Figure 13 and showing the details of the actuating mechanism;

Figure 11 is a cross section of the arm of Figure 10 and showing the operating mechanism therefor;

Figure 12 is an enlarged detail of a further modification according to the invention;

Figure 13:
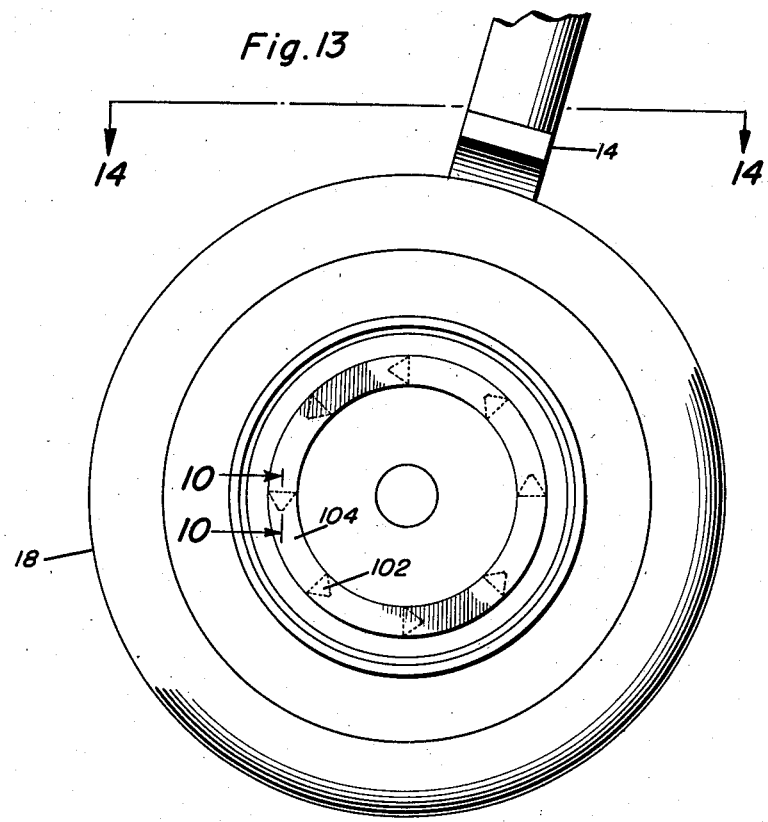
Figure 13 is a side elevational view of an aircraft ground wheel showing a preferred construction according to the invention.
Figure 14:
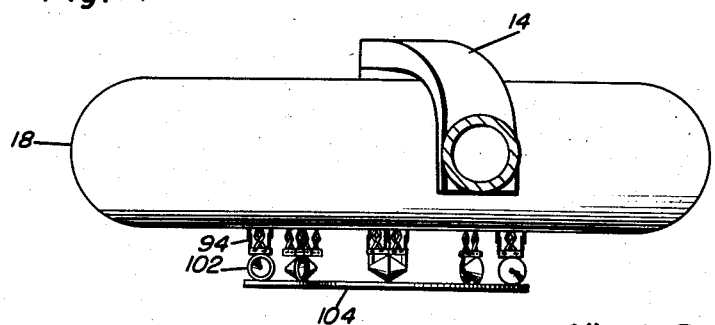
Figure 14 is a transverse view taken substantially on the plane indicated by the section line 14—14 of Figure 13.

In the exemplary embodiment of the invention a portion of an aircraft is indicated at 10 having a recess 12 into which a retractible landing gear 14 may be operatively secured. A wheel 16 is journaled on the landing gear 14 and is provided with a cushion tire 18. The wheel 16 is provided with a plurality of spaced plates 20 and 22 in which are provided a plurality of cup-like recesses 24. Secured in the bottom 26 of each of the cup-like recesses 24 is a base 28 of an extensible supporting arm 30. Anemometer type cups or wind scoops 32 are mounted on the external ends of the collapsible supporting arms 30. The wind scoops 32 are arranged in the usual anemometer arrangement, that is, they all face in the same direction around the periphery of the wheel. Consequently, when looking at the arangement from any direction half of the cups 24 have their open side presented in the direction of view and the other half have their closed side in the direction of view.

As is well known this anemometer type cup when exposed to a stream of air has a propelling effect in one direction so that a wheel on which they are mounted tends to rotate about the axis of the arrangement of anemometer cups.

As shown in Figures 1 and 2 each cup 32 is provided with its own collapsible support 30 so that the cups are individually supported in the wind stream or retracted into the recesses 24. However, it is frequently more desirable to provide a minimum number of extensible arms 30 and provide an annular mounting base 36 with a maximum number of scoops 32 distributed around the periphery of the support 36. Not only does the utilization of the annular support 36 tend to strengthen and rigidify the structure but it allows ready mounting of the optimum number of wind scoops 32 about the periphery of the wheel.

Obviously the collapsible arms 30 may be constructed in a variety of manners. For example, in Figure 8 the arm 30 is constructed of a plurality of coaxial cylinders successively sliding within each other and distended by means of a spring 40. A base cylinder 42 is then rigidly attached to the base 28 and is provided with guiding slots 44 in which guide pins 46 of the next adjacent cylinder 48 may readily slide. Any number of successive cylinders may be applied to provide an arm of any desired length. Preferably the rear side of the cylinders is provided with an extending lip 50 so as to properly reinforce the arm against the turning motion because of the application of wind pressure to the scoop 32.

When the landing wheel is retracted edgewise into a receiving slot as indicated in Figures 1 and 2 some means must be provided for retracting the collapsible arms in order to find the scoops 32 within the dimensions of the wheel. In the type of arm shown in Figure 8 in which the spring 40 constantly resiliently urges the cups into distended position it is necessary to provide a cam surface 52, best shown in Figure 1, for compressing the springs 40 to retract the cups into the dimension of the wheel. Preferably the cam 52 is provided at the leading edge of a shroud 54, Figure 5, which is pivotally mounted at one end 56 on a shaft 58 mounted within the body of the aircraft having spring 60 distending the shroud 54 when the wheel carriage 14 is lowered. Preferably the shroud 54 is provided with a roller 62 for contacting the surface of the tire 18 so that the shroud 54 is retracted when the wheel 16 is retracted. When the landing gear 14 is retracted returning the wheel 16 to its recess 12 the cam 52 contacts the cups 32 compressing the springs 40 to permit the wheel and its anemometer wind scoops to be stored within the usual wheel space. Likewise the retracted wheel retrieves the cam 52 so that the doors 66 and 68 may close to properly house the retracted wheel 16.

In those cases where the landing wheels fold laterally into annular recesses in the body or wings of the aircraft no special attention need be taken to compressing the wind scoops as they will automatically be compressed when the wheel is seated.

In the modification of the collapsible arm according to Figure 9 recesses 70 are provided with an opening 72 in the base thereof to which is connected a fluid supply line 74. The fluid supply line 74 may be connected to any suitable supply of fluid under pressure, such as, tanks of compressed air or gas, but is preferably connected to the usual fluid operating system of the plane where pressure is maintained by a compressor driven either directly or indirectly from the main power motor. Any suitable control valve, not shown, may be utilized to apply or exhaust the fluid from the line 74. Cylinders 76 are arranged in concentric relation so that each succeeding cylinder is a piston for the preceding cylinder. A tensile type spring 80 is connected between a base 82 supporting the scoop 32 and an anchor 84 adjacent the base of the arm. The tensile spring 80 constantly tends to keep the cup 32 in a retracted state but it may be readily projected outwardly by applying pressure fluid within the cylinders 76 and 80 and its succeeding cylinders. In the modification according to Figures 10 and 11 a wheel is provided with recesses 84 which may be square or rectangular in cross section and a plurality of cylinders 86, 88, 90 and 92 are mounted adjacent the sides of the recesses 84 and in the bottom thereof. A collapsible member is then provided in the form of lazy tongs 94, one of the lazy tongs being arranged in each side of the recesses 84. The cylinders 86 to 92 have fluid connections 96 and 98 which are branched and applied to each of the cylinders so that fluid may be applied either to retract or distend the cylinders. When the cylinders are retracted the lazy tongs will be extended to extend the base 100 on which the cups 102 are mounted into the wind stream adjacent to the wheel. Likewise when the cylinders are extended the lazy tongs will be retracted to house the wind scoop 102 within the recess 84. A cover 104 is rigidly attached to the scoop 102 so that when the scoop is in retracted position the cover covers the cup or recess 84 to provide a relatively smooth wheel surface. Obviously, the cover 104 may if desired be either rectangular and cover a single opening or may be annular and cover all of the recesses. The scoop 102 is shown as of the vortex type.

The modifications of Figures 9 to 11 may obviously be retracted or distended at the will of the operator. This is particularly desirable on those crafts where the wheels are not housed during flight but are exposed so that any protuberance on the wheel would constitute an undesirable and unnecessary drag on the aircraft.

In the modification according to Figures 3 and 4, the cups 110 are mounted on arms 112 which are pivotally connected in recesses 114 by means of pins 116 and are normally projected outwardly from the wheel by means of spring members 118. The wheel being provided with recesses 120 to house the wind scoop 110. Preferably the arms 112 are pivoted adjacent the rim 122 of the wheel 124 and are provided with shoulders 126 which contact the inner edge of the rim 122 so that the arm 112 is at a slightly angular relation so that the wind scoop 110 may be compressed into the recess 120 when the wheel is seated in its housing.

In some instances it may be desirable to mount the wind scoops on the outer surface of the wheel and as shown in Figure 12 arms 130 may be pivotally connected to the outer surface of the wheel 132 which may be provided with recesses 134 for receiving wind scoops 136. The arms 130 will be yieldingly urged to extended position by any suitable means (not shown) such as the coil spring similar to springs 118, Figure 4.

It will be readily apparent that the present invention provides a means for projecting a plurality of airscoops laterally beyond the confines of a wheel so that the air scoops are in the free air flow adjacent the wheel and are in nowise disturbed by the air eddies or currents which occur under the tire adjacent to the surface of the wheel. It will likewise be apparent that the scoops of the present invention may be either compressed by means of contact with some portion of the craft or may be readily controlled by means of fluid pressure or other suitable control means.

In other instances the recesses or cups to receive the wind scoops and support arms may not be feasible and in other arrangements, such for example as single disk wheels, there will be no place to mount the recesses. In such instances the recesses may be omitted and the wind scoops and support arms simply folded against the surface of the wheel, where they will be protected by the overhang of the tire.

For purpose of exemplification particular embodiments of the invention have been shown and described according to the best present understanding thereof. It will be apparent to those skilled in the art that many changes and modifications can be made therein without departing from the true spirit of the invention.

Having described the invention, what is claimed as new is:

1. In an aircraft having landing wheels, a pre-rotating device comprising a plurality of wind scoops arranged about the periphery of said wheels, recesses in said wheels for housing said scoops, extensible supports secured between the bottoms of each of the recesses and said wind scoops for projecting said scoops into the air stream adjacent said wheel.

2. In an aircraft having retractible wheels and resilient tires extending laterally of said wheels, a wheel spinning device comprising an annular support, a plurality of anemometer type wind scoops mounted on said support, said wheel having a plurality of recesses therein, extensible members secured in said recesses and attached to said scoops, said extensible members being operable to project or retract said wind scoops.

3. In an aircraft having retractible wheels and resilient tires extending laterally of said wheels, a wheel spinning device comprising an annular support, a plurality of anemometer type wind scoops mounted on said support, said wheel having a plurality of recesses therein, extensible members secured in said recesses and attached to said scoops, said extensible members being operable to project or retract said wind scoops, said support forming a closure for said recesses when said scoops are retracted.

4. In an aircraft having retractible wheels and resilient tires mounted on and extending laterally of said wheels, a wheel spinning device comprising an annular support, a plurality of anemometer type wind scoops mounted on said support, said wheel having a plurality of recesses therein, collapsible members secured in each of said recesses, means for actuating said collapsible members to project or retract said wind scoops.

5. In an aircraft having retractible wheels and resilient tires extending laterally of said wheels, a wheel spinning device comprising an annular support, a plurality of anemometer type wind scoops mounted on said support, said wheel having a plurality of recesses therein, collapsible members secured in said recesses, fluid operated means for actuating said collapsible members.

6. In an aircraft having landing wheels and tires mounted on said wheels, said tires being of materially greater width than said wheel, a wheel spinning device comprising a plurality of wind scoops, said wheels having recesses receiving said scoops, supports for said scoops, said supports being mounted on said wheel, resilient means urging said scoops into extended position beyond the sides of said tires.

7. In an aircraft having a ground contacting wheel, a wheel spinning device comprising a plurality of wind scoops, said wheel having recesses to recive said scoops, each of said scoops including a base member, an extensible member secured to said base and to the bottom of said recess.

8. In an aircraft having a ground contacting wheel, a wheel spinning device comprising a plurality of wind scoops, said wheel having recesses to receive said scoops, each of said scoops including a base member, an extensible member secured to said base and to the bottom of said recess, fluid means for controlling the position of said extensible member.

9. In an aircraft having a ground contacting wheel, a wheel spinning device comprising a plurality of wind scoops, said wheel having recesses to receive said scoops, each of said scoops including a base member, an extensible member secured to said base and to the bottom of said recess, fluid means for controlling the position of said extensible member, said extensible members each including a plurality of lazy tongs.

10. In an aircraft having a ground contacting wheel, a wheel spinning device comprising a plurality of wind scoops, said wheel having recesses to receive said scoops, each of said scoops including a base member, an extensible member secured to said base and to the bottom of said recess, fluid means for controlling the position of said extensible member, said extensible members each including a plurality of lazy tongs, a cover attached to said scoops for closing said recesses when said extensible members are retracted.

11. In an aircraft having a ground contacting wheel, a wheel spinning device comprising a plurality of wind scoops, said wheel having recesses to receive said scoops, each of said scoops including a base member, an extensible member secured to said base and to the bottom of said recess, fluid means for controlling the position of said extensible member, said extensible members each including a plurality of lazy tongs, an annular plate secured to the outer side of said scoops, said plate constituting a cover for said recesses when said extensible members are collapsed.

ALBERT P. DAVIS.

References Cited in the file of this patent

UNITED STATES PATENTS

| Number | Name | Date |
| --- | --- | --- |
| 2,333,191 | Mitton | Nov. 2, 1943 |
| 2,339,241 | Davis | Jan. 18, 1944 |
| 2,408,963 | Westcamp | Oct. 8, 1946 |

FOREIGN PATENTS

| Number | Country | Date |
| --- | --- | --- |
| 328,746 | Germany | Dec. 1, 1921 |
| 678,786 | France | Jan. 2, 1930 |
| 556,068 | Great Britain | Sept. 20, 1943 |